Patented Sept. 22, 1953

2,653,169

UNITED STATES PATENT OFFICE 2,653,169

N-N'-DICHLORO-1,8-DIFORMAMIDO-p-MENTHANE

Melvin D. Hurwitz, Huntingdon Valley, and Robert W. Auten, Jenkintown, Pa., assignors to Rohm & Haas Company, Philadelphia, Pa., a corporation of Delaware No Drawing. Application June 11, 1952, Serial No. 292,984

1 Claim. (Cl. 260—561)

This invention relates to the N-N'-dichloro-1,8-diformamido-p-menthane of the formula

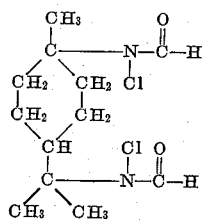

and to a process of preparing it.

This application is a continuation-in-part of our copending application 239,636, filed July 31, 1951.

The compound is made by reacting a hypohalite, preferably a tertiary-alkyl hypohalite such as tert.-butyl hypochlorite, with 1,8-diformamido-p-menthane of the formula

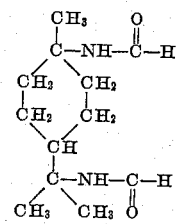

At least 2 moles—and preferably from about 2.2 to 3 moles—of hypohalite are used per mole of said diformamido compound.

The reaction can be carried out at a temperature from 0° C. to 100° C. but a temperature from 15° C. to about 70° C. is much preferred.

It has been found that inorganic hypochlorites and hypobromites such as those of sodium or potassium, or even hypohalous acids, can be used but that more satisfactory results are obtained when a tertiary-alkyl hypohalite is employed. And while it is true that any tertiary-alkyl hypohalite can be used, it is preferred to employ those containing a tert.-butyl or a tert.-amyl group for reasons of efficiency and economy.

The compound 1,8-diformamido-p-menthane, from which the N-N'-dichloro-1,8-diformamido-p-menthane is produced, is itself made by reacting hydrogen cyanide, sulfuric acid, water and limonene as shown in Newman M. Bortnick's application for Letters Patent Serial No. 172,624, filed July 7, 1950, now U. S. Patent 2,632,022 of March 17, 1953.

The following example serves to illustrate the process of this invention.

*Example*

Into a three-necked flask equipped with stirrer, reflux condenser and thermometer was charged 317 grams (1.4 moles) of 1,8-diformamido-p-menthane,

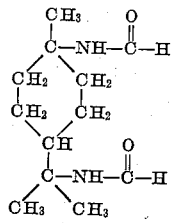

and 360 grams (3.3 moles) of tert.-butyl hypochlorite. The mixture was stirred at room temperature. After a short time an exothermic reaction began which carried the temperature to 40° C., at which point it was maintained for eight hours. A crystalline solid separated as the reaction progressed. This was removed by filtration and was thoroughly dried. The yield was 76% of theory and the structure was confirmed by analysis (Found: N=9.2%; Cl=23.3%. Theory: N=9.5%; Cl=24.0%).

The product of this invention is particularly useful for the preparation of 1,8-diisocyanato-p-menthane which difunctional compound is used in the manufacture of synthetic resins.

We claim:

N-N'-dichloro-1,8-diformamido-p-menthane.

MELVIN D. HURWITZ.
ROBERT W. AUTEN.

No references cited.